(12) United States Patent
Stevens, III

(10) Patent No.: US 9,001,136 B2
(45) Date of Patent: Apr. 7, 2015

(54) FORMAT AND METHOD FOR REPRESENTING A DYNAMIC DIGITAL IMAGE

(75) Inventor: Harden E. Stevens, III, Lexington, SC (US)

(73) Assignee: NCR Corporation, Duluth, GA (US)

( * ) Notice: Subject to any disclaimer, the term of this patent is extended or adjusted under 35 U.S.C. 154(b) by 393 days.

(21) Appl. No.: 13/483,665

(22) Filed: May 30, 2012

(65) Prior Publication Data

US 2013/0321435 A1 Dec. 5, 2013

(51) Int. Cl.
*G06T 1/00* (2006.01)
*G06F 3/00* (2006.01)

(52) U.S. Cl.
CPC ........................................ *G06F 3/00* (2013.01)

(58) Field of Classification Search
CPC ............... G06T 1/005; H04N 2201/33378; H04N 1/32128; H04N 1/00132; G06F 9/3879
USPC ...................................................... 726/26–31
See application file for complete search history.

(56) References Cited

U.S. PATENT DOCUMENTS

| | | | |
|---|---|---|---|
| 7,830,967 B1* | 11/2010 | Jannard et al. | 375/240.26 |
| 2005/0188382 A1* | 8/2005 | Nagendra et al. | 719/328 |
| 2008/0005787 A1* | 1/2008 | Aldred | 726/4 |
| 2011/0151838 A1* | 6/2011 | Olincy et al. | 455/412.1 |

OTHER PUBLICATIONS

Keith Debattista, "The Threats of Steganography", GFI Blog, Jan. 11, 2010.*

* cited by examiner

*Primary Examiner* — Kee M Tung
*Assistant Examiner* — Nicholas R Wilson
(74) *Attorney, Agent, or Firm* — Harden E. Stevens, III; Joseph P. Mehrle

(57) ABSTRACT

An image format and method are presented for storing a digital image in the image format. The image format includes image data and executable computer instructions. Displaying a digital image stored in this image format requires executing the stored executable instructions which generate the image data for the associated digital image.

10 Claims, 10 Drawing Sheets

FORMAT AND METHOD FOR REPRESENTING A DYNAMIC DIGITAL IMAGE

FIELD OF THE INVENTION

The present invention relates generally to digital images, and in particular to a file format for a digital image that includes image data and computer executable code.

BACKGROUND

Any discussion of the prior art throughout the specification should in no way be considered as an admission that such prior art is widely known or forms part of common general knowledge in the field.

Digital cameras have surpassed film based cameras as a means for capturing images. In addition to digital cameras that capture images, there are also numerous software products that can modify digital images or create new images containing graphics or other information. The ability to capture or create images and store them electronically has lead to wide spread use of digital images in computer applications and on the Internet.

A traditional digital image comprises image data that represents pixel data for the original image and is organized and stored in a computer file. The image data is organized according to one of a number of different image formats created to store digital image data. JPEG and GIF formats are examples of standardized image formats that are commonly used by computer applications and on the Internet. JPEG is an acronym for the Joint Photographic Experts Group which created a standard that defines the image format. Images stored in this format have a file name that use the extension "JPG" to identify the type of image format used to store the image. GIF is an acronym for Graphics Interchange Format and was introduced by CompuServe. Images stored in this format have a file name that use the extension "GIF" to identify the type of image format used to store the image.

Many different digital image formats have been defined and each has certain characteristics and advantages that are typically related to their ability to reduce or compress the image data prior to storage. To reduce storage requirements, it is common for image formats to specify the use of one or more compression algorithms that reduce the amount of the image data required prior to storage. The stored image data must then be decompressed prior to being rendered for display or printing. Compression algorithms are generally classified as either lossless, that is they can recover all data removed during the compression process, or lossy, that is they are not able to fully recover data removed during the compression process.

Before a digital image can be displayed on a user display or printed, the digital image data must be rendered. Rendering a digital image is a process that recreates, as accurately as possible, image data for the original image from the stored image data. The recreated image data is in a form that can be easily displayed for viewing or printed. Web browsers, e-mail clients and other software applications that display or print digital images use software known as a rendering engine to render the digital image for viewing or printing.

The electronic image formats have at least one thing in common; they define how to store and recover one or more still digital images. The still images are static in that the elements of each image are reproduced, as faithfully as the image format allows, each time the image is rendered. Additionally, while each image format requires processing to recover the image, the type of processing is well know for each image format and the rendering engine of each application includes program code to process each supported image format to recover the image.

One area that uses digital images is product coupons. Product coupons are used to reduce the price of goods or services. For example, a company may offer a coupon that provides 10% off one of the company's products as a promotion. Before digital images, coupons were printed and distributed to customers in newspapers, flyers and magazines. Companies only accepted original printed coupons so the quantity of coupons was known and limited. This meant the maximum cost for redeeming the coupons could be calculated because the quantity was known.

However, it is now common to distribute coupons as a digital image using email, web sites, text messages, social media and others channels. With digital coupons, the quantity of coupons cannot be controlled because a digital coupon can be electronically copied and redistributed any number of times. Additionally, a person can print a single digital coupon multiple times and use the coupons to reduce the price of the associated product or service to or close to zero. This circumvents the intended promotional purpose of a coupon.

In another application, airports or other types of transportation terminals have started using electronic boarding passes to allow passengers to gain access to areas of a terminal restricted to confirmed passengers. An electronic boarding pass typically includes a bar code stored as a digital image that is electronically sent to an electronic device registered to a passenger after the passenger has completed a check-in process. The bar code is encoded with information unique to the passenger and only intended to be used by the passenger. However, because it is a digital image, copies can be forwarded to other people creating security issues.

Another issue is enforcing copyright restrictions on digital images. Once a digital image can be viewed on an electronic device, there is little that can be done to stop improper copying of the image. Placing a visible copyright notice on an image does little to stop people from copying the image and placing a copyright notice in the image data file also does not stop people from copying the image.

Therefore, for the above reasons and others, there is a need for a new digital image format that provides additional functions beyond simply reproducing a stored digital image and that can control copying a digital image.

SUMMARY OF THE INVENTION

It is an object of the present invention to overcome or ameliorate at least one of the identified limitations, or to provide a useful alternative.

Among its several aspects, the present invention recognizes a condition where static digital images stored in conventional image formats do not provide the level of security needed or the flexibility to handle changing market requirements.

In accordance with one aspect of the present invention, there is provided an image format for storing a digital image that includes both image data and executable data where the executable data generates the image data for the associated digital image. The executable data can communicate with remote computers and receive information that controls what digital image is generated. The executable data can be programmed to perform any number of functions to generate the image data.

In accordance with another aspect of the present invention, the image format further includes program variables that are used by the executable data and can in some cases be updated and stored back in the original image file. The program variables and information received from a remote computer can cause the executable data to generate a different digital image every time the image is rendered.

In one embodiment of the present invention, there is provided a digital image format for storing information and computer executable data (instructions) that generate a digital image. The information includes image data, image information and program variables. The digital image format comprises a header information section that includes information about the digital image format and the digital image. The digital image format further comprises an image data section which includes information related to the digital image such as pixel data. The digital image format additionally includes an executable code section and a program variables section. The executable code section includes computer executable instructions that when executed by a computer perform operations to generate viewable image data for the digital image. The program variable section includes variables and static data defined and used by the computer executable instructions when executed by the computer.

In another embodiment of the present invention, there is provided a computer implemented image rendering method for rendering a digital image using computer data organized in an image format where the image format includes image data and computer executable instructions. The method comprises the steps of: receiving the digital image organized in the image format wherein the digital image includes original image data and computer executable instructions; establishing a virtual execution environment to execute the computer executable instructions wherein the virtual execution environment provides an application program interface used by the computer executable instructions to receive information and request services and wherein the virtual execution environment provides the computer executable instructions access to the image data; executing the computer executable instructions within the virtual execution environment wherein the computer executable instructions, when executed, use the application program interface to receive information and request services from the virtual execution environment and wherein the computer executable instructions use the received information to generate new image data; and receiving the new image data as output from the computer executable instructions.

In another embodiment of the present invention, there is provided a computer implemented method for displaying a digital image on a display device. The method comprising: receiving first data representing the digital image where the first data is organized in an image format that includes computer executable instructions and image data; executing the computer executable instructions included in the received first data; receiving second data from a remote computer as a result of executing the computer executable instructions; producing, by executing the computer executable instructions, third data using the received second data; and displaying the third data on the display device.

In another embodiment of the present invention, there is provided a computer implemented method for displaying a digital image on a display device. The method comprising: reading first data representing the digital image from a file where the first data is organized in an image format that includes computer executable instructions, program variables and image data; executing the computer executable instructions included in the received first data; generating, by executing the computer executable instructions, second image data using the image data included in the first data and a first variable of the program variables included in the first data; modifying, by executing the computer executable instructions, the first variable to indicate generating the second image data; modifying the file by replacing the original data for the first variable with the data for the modified first variable; and displaying the second image data on the display device.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the drawings and the detailed description. The drawings are not necessarily drawn to scale. Throughout the drawings, like element numbers are used to describe the same parts throughout the various drawing figures and charts.

DETAILED DESCRIPTION

Figure 1:
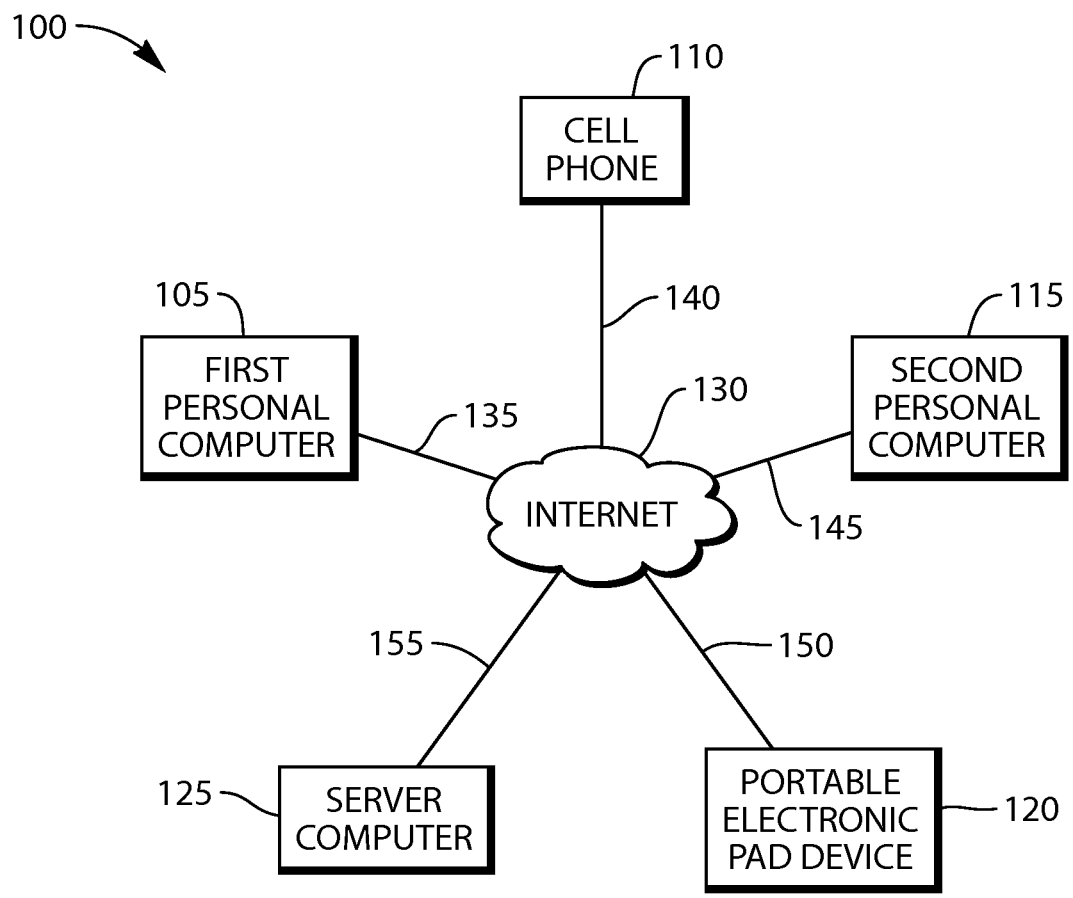
FIG. 1 is a high level diagram illustrating a system of networked computers and portable smart electronic devices.

In the following description, numerous details are set forth to provide an understanding of the claimed invention. However, it will be understood by those skilled in the art that the claimed invention may be practiced without these details and that numerous variations or modifications from the described embodiments are possible.

A digital image can be organized and stored according to a number of different image formats. A definition exists for each image format and the definition defines how a digital image must be processed, organized and stored. The definition further defines how a digital image stored according to the image format is recovered. Some image formats include processes for compressing image data or perform other functions on the image data.

When a digital image, stored in an image format, is displayed or printed, for example by a web browser application or email client application, a software component such as a rendering engine is used to recover the stored digital image. A rendering engine is software designed to recognize image data stored in common image formats and to process the stored data according to the defined rules of the image format to recover the original digital image to display or print. A rendering engine can be included as an integrated software component of an application or a rendering engine can be an independent component such as a plug-in component that is installed into the application after it has been released, or both.

One aspect of the present invention defines a new digital image format referred to herein as a "Computed Image Format" ("CIF"). The CIF image format defines how digital image data is processed prior to storage in a CIF formatted file and the process for generating an image from the stored data. Both processes differ from current image formats in a number of ways. The CIF definition defines how image data is stored but also defines the use of computer executable instructions and data that is also stored with the image data. The CIF definition further defines a virtual execution environment that is used to execute the stored computer executable instructions. As described below, the computer executable instructions, when executed in the virtual execution environment, produce a digital image that can be displayed or printed. The computer executable instructions can be configured, by a programmer, to perform any number of functions that will produce a digital image. For example, the computer executable instructions can be configured to produce a digital image by: processing the image data stored with the computer executable instructions; creating a new digital image without using any stored image data; or communicating with a remote computer to send and receive data where the received data is used to create a new image or to modify the stored image data.

In some cases, no actual image data is stored in a CIF formatted file, only computer instructions are stored. In these cases, when the computer instructions are executed, they either generate the new image data or cause image data or other information to be received from a source remote from the computer or device executing the computer instructions. Remote sources include computer servers, computers and other electronic devices able to communicate with the device executing the computer instructions over a network. The network can include the Internet and/or a private intranet and the network can communicate data using one or more of cellular, wired or wireless physical networks. When image data or other information is received from the remote source, the image data or other information is further processed by the instructions to generate new image data or modify the stored image data or the received image data can be directly outputted with no modifications.

Turing now to FIG. 1, there is provided a high level diagram illustrating a system 100 of networked computers and smart mobile electronic devices. A smart device includes a processing element that executes software that controls the device and is further able to communicate with other devices and computers. Examples of smart devices include but are not limited to smart cell phones and tablet devices. The system 100 includes a first and second personal computer 105, 115, a cell phone 110 and a portable electronic pad device 120, a server computer 125, the Internet 130 and a number of local data networks 135, 140, 145, 150, 155. The first and second personal computers 105, 115, the cell phone 110 and the portable electronic pad device 120 communicate with the server computer 125 using the Internet 130 and their local data networks 135, 140, 145, 150, 155 that connect to the Internet 130.

The system 100 is provided as an example and not intended to limit the number or type of computers, servers or other types of smart mobile devices or restrict the number or type of networks used to communicate with elements of the system 100. In addition, the networks can use wired or wireless communications. In some embodiments, the Internet 130 is replaced with a private data network and all of the computing devices 105, 110, 115, 120, 125 are connected to it.

The cell phone 110 is a smart phone and connects to the Internet 130 using a cellular phone network 140 that supports voice and data communications. The portable electronic pad device 120 is a smart device and connects to the Internet 130 using a cellular network or a wireless (e.g., WIFI) computer data network 150. The first personal computer 105 is connected to the Internet 130 over a wired local area network 135. The second personal computer 115 is connected to the Internet 130 over a broadband cable TV data network 145. The server computer 125 is connected to the Internet 130 over a wired local area network 155.

These types of data networks 135, 140, 145, 150, 155 are provides as examples of the types of networks that can be used and should not be construed to be a requirement or a limitation. There is also no requirement that the Internet 130 is used as a backbone network that connects all the devices. The only requirement is that the computing devices 105, 110, 115, 120 are able to communicate with the server computer 125, or a computing device performing the functions of the server, to send and receive data.

In some embodiments, a computing device is not required to be in continuously communication with a network or the server computer 125. While not all aspects of the present invention would be available to the computing device when it is not in communication with the server computer 125, some aspects of the present invention would still be available and provide advantages over current technology. Loss of communications can occur when the computing device is portable and moves out of range of the network. In other embodiments, a computing device may not have the ability to directly communicate with the required network. In these cases, information is transferred to the computing device using portable physical components such as a jump drive sometimes called a USB memory stick or other suitable components that can store and transport computer information such as a CIF formatted digital image to the computing device for display.

Figure 2:
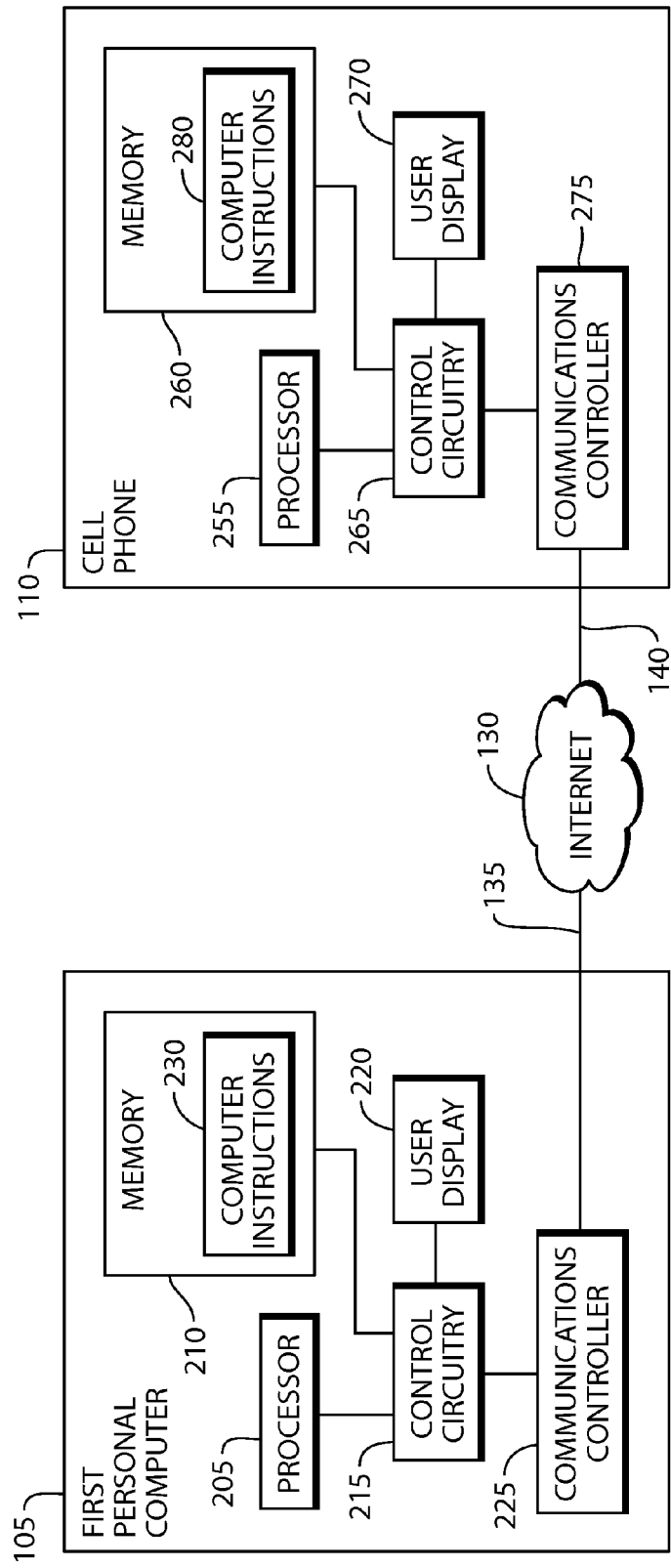
FIG. 2 is a block diagram illustrating the high level components of a first personal computer and a smart cell phone.

FIG. 2 is a block diagram illustrating the high level components of the first personal computer 105 and the cell phone 110. The first personal computer 105 includes a processor 205, memory 210, control circuitry 215, a user display 220 and a communication controller 225. The memory 210 includes both short term memory and long term memory. In some embodiments, the long term memory includes a hard disk drive. In other embodiments, the long term memory includes only solid state electronic memory devices (e.g., flash memory). Stored in the memory 210 are computer instructions 230 that are organized into a plurality of programs. The computer instructions 230 are executed by the processor 205 and when executed, the computer instructions 230 cause the processor 205 to control the components of the personal computer 105 and to generate all the functions of the personal computer 105. The control circuitry 215 provides the hardware interface between the processor 205 and the other components of the computer 105.

The user display 220 is an LCD display that is used to visually communication information to a user. In some embodiments, the user display 220 includes a touch sensitive device that detects input from the user. The computer instructions 230, when executed by the processor 205, further cause information to be generated and displayed on the user display 220 and causes information to be received from the touch sensitive device, if present. The communications controller 225 provides an interface to the wired local area network 135 and then to the Internet 130. The computer instructions 230 further cause the communications controller 225 to send and receive information over the Internet 130. In some embodiments, the communications controller 225 provides an interface to a wireless network and then to the Internet 130.

The cell phone 110 includes a processor 255, memory 260, control circuitry 265, a user display 270 and a communication controller 275. The memory 260 includes both short term memory and long term memory. Both the short and long term memories use solid state electronic devices. Stored in the memory 260 are computer instructions 280 that are organized into a plurality of programs. The computer instructions 280 are executed by the processor 255 and when executed, cause the processor 255 to control the components of the cell phone 110 and generate all the features and functions of the cell phone 110. The control circuitry 265 provides the hardware interface between the processor 255 and the other components of the cell phone 110.

The user display 270 is an LCD display used to visually communication information to a user. In some embodiments, the user display 270 includes a touch sensitive device that detects input from the user. The computer instructions 280, when executed, cause the processor 255 to display information on the user display 270 and input information from the touch sensitive device. The communications controller 275 provides an interface to the wireless cellular network 140 and then to the Internet 130. The computer instructions 280, when executed, further cause the communications controller 225 to send and receive information over the Internet 130. In some embodiments, the communications controller 275 additionally provides one or more interfaces to computer wireless networks, e.g., WIFI and Bluetooth.

Figure 3:
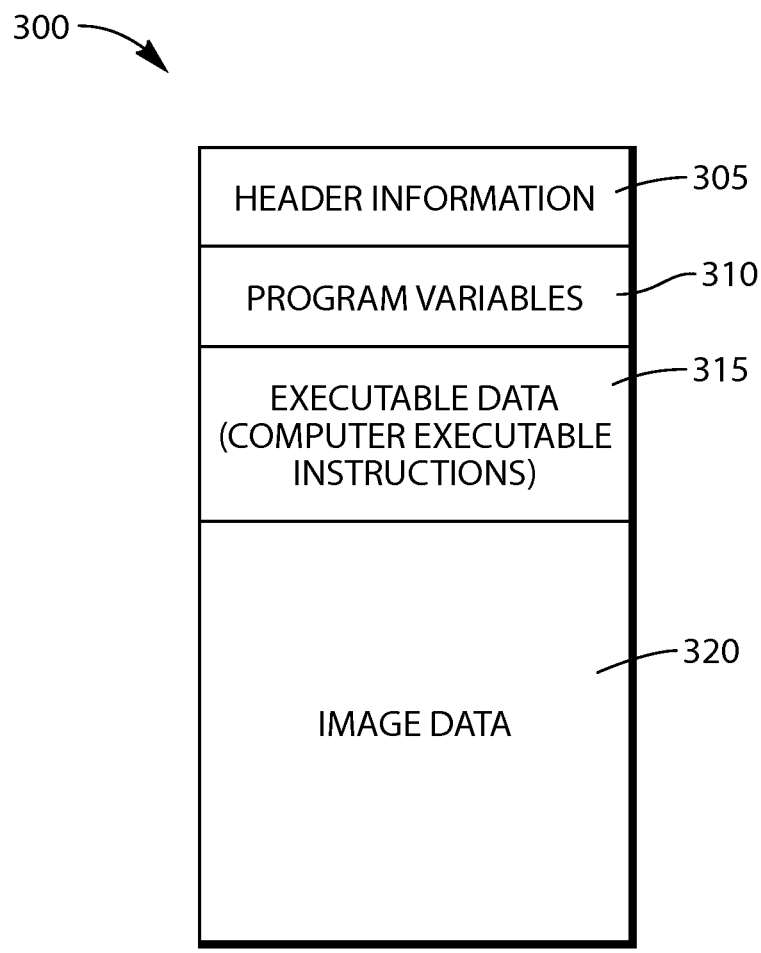
FIG. 3 is a block diagram illustrating the sections that comprise a digital image file organized according to the Computed Image Format definition.

Referring now to FIG. 3, there is provided a block diagram illustrating the high level sections that comprise a digital image file 300 organized according to the Computed Image Format (CIF) definition. The CIF definition includes four main sections. They are the Header Information 305, Program Variables 310, Executable Data 315 and Image Data 320. The header information section 305 includes a number of fields that contain information about the file 300 and information about the other three sections of the file 300. Table 1.0 below is a partial list of the fields included in the header information section 305.

TABLE 1.0

HEADER INFORMATION

| ID | NAME |
|---|---|
| 1 | COMPUTED IMAGE FORMAT VERSION |
| 2 | PROGRAM LANGUAGE |
| 3 | IMAGE NAME |
| 4 | UNIQUE IMAGE ID |
| 5 | DATE CREATED |
| 6 | OWNER INFOMATION |
| 7 | OFFSET TO PROGRAM VARIABLES |
| 8 | OFFSET TO EXECUTABLE DATA |
| 9 | OFFSET TO IMAGE DATA |
| 10 | TOTAL SIZE OF IMAGE FILE |

The computed image format version (Table 1.0, ID 1) is the version number of the CIF definition that was used to store the file 300. This assumes there will be future versions of the CIF definition which means future files could be stored in a different format. The program language field (Table 1.0, ID 2) identifies the programming language is used by the executable data 315. The image name field (Table 1.0, ID 3) is a user defined field that contains the name of the image. The unique image ID field (Table 1.0, ID 4) is a field that contains a globally unique ID that uniquely identifies the image. The date created field (Table 1.0, ID 5) is the date the file 300 was originally created. The owner information field (Table 1.0, ID 6) is information that identifies the owner. The offset fields (Table 1.0, IDs 7,8,9) contain the number of bytes from the start of the file 300 to the start of the referenced section. The total size of image file filed (Table 1.0, ID 10) is the total number of bytes in the file 300.

As will be discussed further below, it is envisioned that one form of a valid CIF image file would contains no image data. In this case, the executable data generates image data that represents the digital image of the file 300. The executable data, when executed, can generate image data in a number of different ways including retrieving complete or partial image data from another computer or generating the image data from scratch.

The program variables section 310 includes any user defined program variables or data used by the executable data. The variables are set to an initial value when the image file 300 is created. When the image file 300 is stored locally, that is stored in a memory that is controllable by the processor executing the executable data 315, it is possible to update the variables stored in this section in the stored image file 300. The program variables in this section can be defined to be any standard data types, such as string, integer and boolean. An example of a program variable would be a string variable used to store a uniform resource locator (URL) identifying the WEB address of a remote computer. The string variable is initialized with the URL for the remote computer when the image file 300 is created. When the executable data 315 is executed, the data for the URL string variable is read and the URL is used to communicate with the remote computer.

The executable data section 315 includes computer executable instructions. The instructions are organized as one or more programs designed to perform functions needed to produce a digital image associated with the file 300. The programs are executed in response to a request to render the digital image associated with the image file 300. A unique set of programs can be designed and created used once a single image file or one or more programs can be designed to be reused as part of different image files. In some cases, the programs for different image files would be the same but the program variables would be unique for each image file. This would customize the produced image data for each different image file.

The computer executable instructions can be written using an interpreted language such as Java or JavaScript. The instructions can also be written in a language that compiles to an intermediate language such as the intermediate language used by most Microsoft .NET programming languages. The program language field (Table 1.0, ID 2) identifies which language has been used to create the computer executable instructions 315 which also control how the computer executable instructions 315 are executed.

The image data section 320, when present, includes data that represents a digital image. The CIF definition does not require that the image data to be stored using any specific format or use any specific types of data compression or encryption. This is because the CIF definition requires that the image data 320 is processed by the executable data 315 prior to being outputted for display or printing. The data processing requirement allows image data 320 to be stored in any standard or user defined format and allows any type of data encryption because the image data 320 must be processes by the programs in the executable data section 315 which can convert the image data 320 to a standard format for display or printing. The image designer has the freedom to create new features and functions for a digital image by designing new program code in the executable data 315 and new image data 320 that is processes by the executable data 315. The only requirement is that the executable data 315 outputs image data in a format that can be displayed or printed. The image designer can store the image data 320 in any format or state as long as the image designer creates executable data 315 that can transform it or convert it into a format that is displayable or printable. In the case where there is no stored image data 320 to process, the executable data 315 must designed to acquire or generate image data.

Figure 4A:
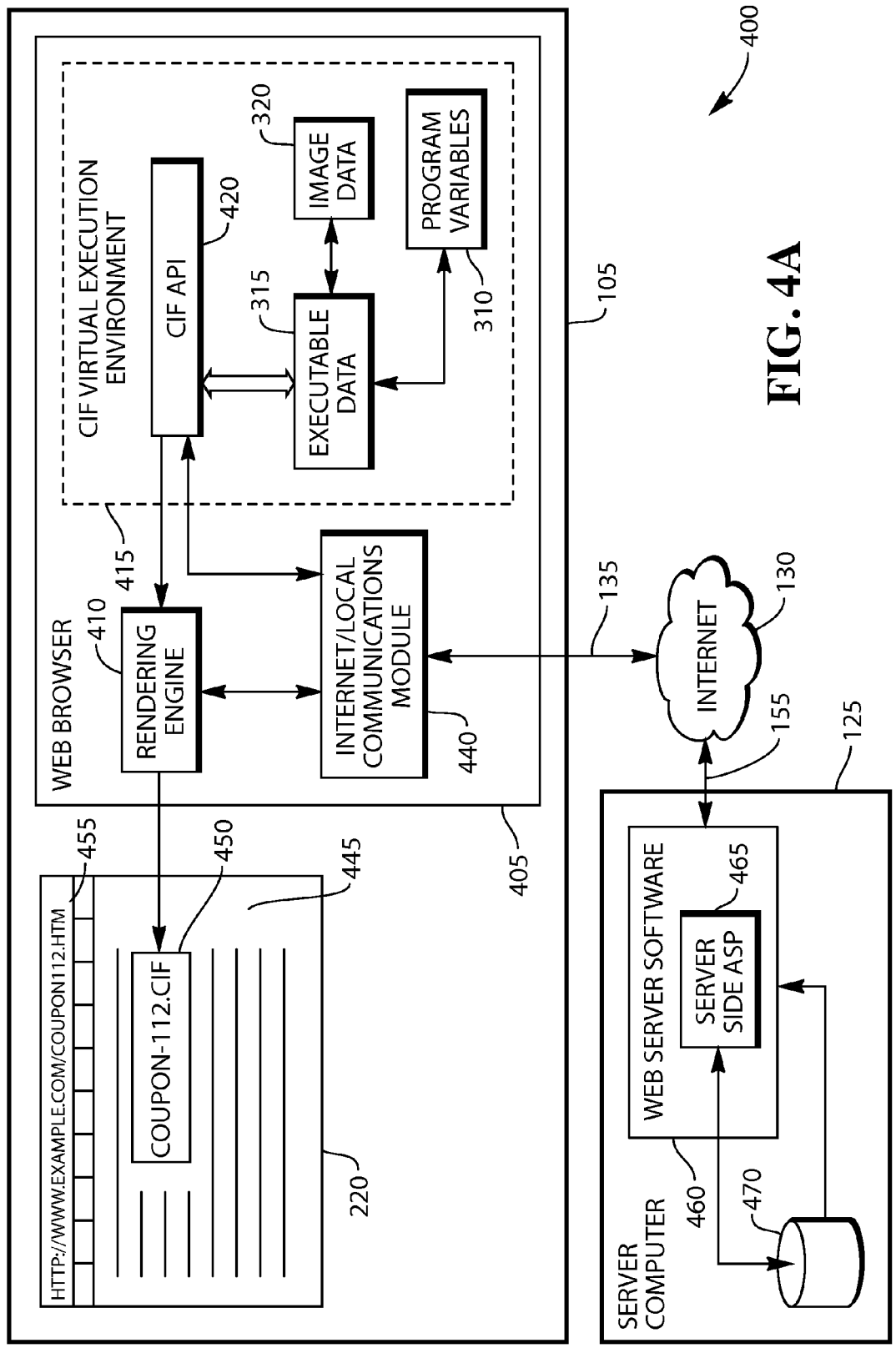
FIGS. 4A and 4B provide block diagrams illustrating a first exemplarily system for displaying a CIF formatted coupon image.
Figure 4B:
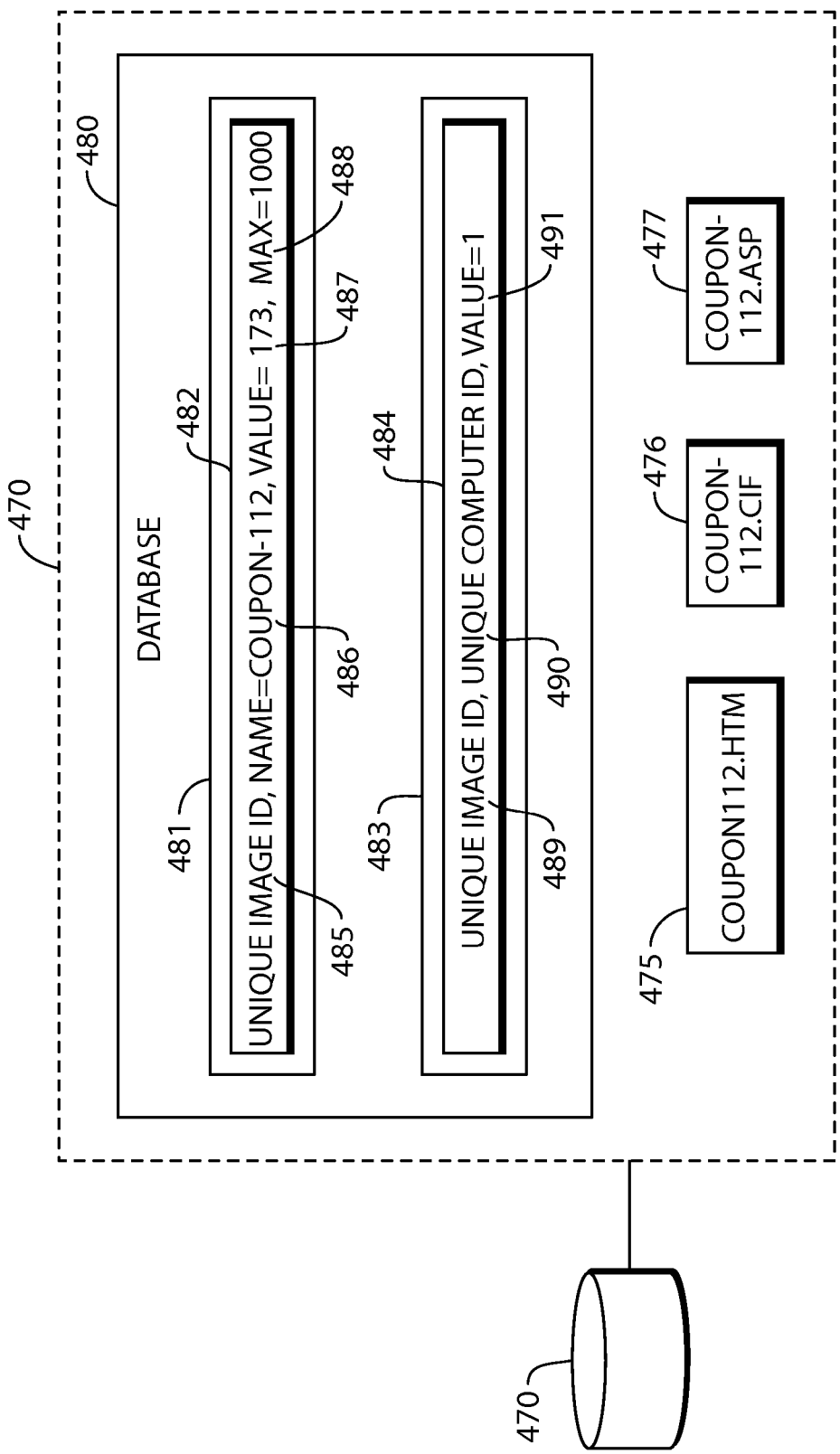

Turning to FIGS. 4A and 4B, there is provided a block diagram illustrating a first exemplarily system 400 for displaying a CIF formatted coupon image. The system 400 includes the first personal computer 105 and the server computer 125 where each computer is connected to the Internet 130 and able to communicate with each other.

The server computer 125 is running a server operation system (OS) such as Microsoft's Windows 2008 Server OS. The server computer 125 is further running web server software 460 such as Microsoft's Internet Information Server (IIS) application that receives and services requests for web pages. The web server software 460 includes a server side Active Server Page (ASP) 465 component which executes server side programs that are included as part of a web page. Such web pages usually have the extension .ASP or .ASPX. The server computer 125 includes the standard hardware elements of a computer including a disk drive 470 that is used to store files 475, 476, 477 and a database 480. The disk drive 470 can be implemented using only electronic components or electronic components combined with mechanical devices such as rotating disks.

A web page that ends with the extension of "ASP" can include program code that is executed by the server side ASP 465 component. When a request for a web page with an ASP extension is received by the web server software 460, the requested web page is read from the disk drive 470 and any program code stored in the web page is identified and executed by the server side ASP 465 component. After the program code from the web page has executed, the resulting web page, minus the program code but including any modifications caused by executing of the program code, is returned to the requestor. The program code can include code to retrieve, modify or create data in a database 480 stored on the disk drive 470. Data from the requestor is communicated to the program code as parameters that are encoded in the URL used to request the web page. The programmer of the program code has complete freedom to create program code that will modify the web page data in any way. The program code can communicate back to the requestor by modifying the web page to include specific data or by changing the entire web page to something unique based on the information from the requestor.

The personal computer 105 is executing a web browser 405 such as Microsoft's Internet Explorer or Mozilla's Firefox. The web browser 405 is displaying a web page 445 on the user display 220. The URL 445 used to retrieve the web page is "HTTP://WWW.EXAMPLE.COM/COUPON112.HTM". The server computer 125 is configured to receive and service web page requests for web address "WWW.EXAMPLE.COM". The web page 445 includes a store coupon 450. The coupon 450 is stored as an image using the computed image format (CIF).

The web browser 405 includes a rendering engine 410 and an Internet communications module 440. The Internet communications module 440 is used to send web requests, such as a request for a web page, and to receive responses to the requests. The rendering engine 410 includes program code that processes received web page data for display or printing. In this example, a request for web page "COUPON112.HTM" is sent by the Internet communications module 440 and received by the web server software 460. The web server software 460 processes the request and returns HTML formatted data for the web page. The web page data includes a reference to an image file ("COUPON112.CIF") that represents the coupon to be displayed. The browser 405 sends a request to the web server software 460 for the image file ("COUPON112.CIF"). The web server software 460 read the COUPON112.CIF file 476 from the disk drive 470 and returns the data for the file 476 to the browser 405.

When the rendering engine 410 receives file data 476 for a CIF formatted image, it creates a CIF virtual executing environment (VEE) 415 and loads the CIF formatted image into the VEE 415. The VEE 415 is designed to execute the executable data 315 portion of a CIF image. The VEE 415 creates an execution environment that conforms to standard object oriented conventions which uses properties and methods.

In this embodiment, the VEE 415 provides a number object properties and methods and requires the executable data 315 to provide at least one code entry point that is called to execute the executable data 315. The VEE 415 properties are accessible by the executable data 315. Some VEE 415 properties can only be read while others can be both read and modified. VEE 415 created properties include the following data: information uniquely identifying the computer 105 executing the web browser 405 (Table 2.0, ID 1), the URL for the web page 455 containing the CIF image (Table 2.0, ID 2), the URL to this CIF image (Table 2.0, ID 3), a memory pointer to the starting location of the image data 320 (Table 2.0, ID 4), a memory pointer to the starting location of the program variables 310 (Table 2.0, ID 5), information from the header information data 305 (Table 2.0, ID 6 and 7) and a WEB Browser ID that identifies the web browser or application program being used to display the image (Table 2.0, ID 8). Table 1.0 contains a partial list of the properties provided by the VEE 415.

TABLE 2.0

VEE PROPERTIES

| ID | PROPERTY | DESCRIPTION |
|---|---|---|
| 1 | COMPUTER ID | UNIQUE ID FOR LOCAL COMPUTER |
| 2 | PAGE URL | URL TO CURRENT WEB PAGE |
| 3 | IMAGE URL | URL TO THIS CIF IMAGE |
| 4 | PTR IMAGE DATA | MEMORY POINTER TO START OF IMAGE DATA |
| 5 | PTR PROGRAM VARIABLES | MEMORY POINTER TO START OF PROGRAM VAR |
| 6 | UNIQUE IMAGE ID | UNIQUE IMAGE ID FROM IMAGE HEADER |
| 7 | FORMAT VERSION | VERSION OF IMAGE FORMAT USED BY IMAGE |
| 8 | WEB BROWSER ID | INFORMATION THAT IDENIFIES THE BROWSER |

The VEE 415 also exposes a number of methods that are available for use by the executable data 315. The methods provide restricted features that are designed to protect the computer from malicious code (e.g., viruses) that might be improperly included in the executable data 315. Table 3.0 contains a partial list of the methods provided by the VEE 415 to the executable data 315.

TABLE 3.0

VEE METHODS

| ID | METHOD | DESCRIPTION |
|---|---|---|
| 1 | RETRIEVE WEB PAGE | RETRIEVE DATA FOR A WEB PAGE |
| 2 | GET DATE/TIME | RETURNS CURENT TIME AND DATE |
| 3 | SAVE DATA | SAVE ALL MODIFIED DATA TO ORIGINAL FILE |
| 4 | OUTPUT IMAGE DATA | OUTPUT IMAGE DATA TO RENDERING ENGINE |
| 5 | TERMINATE EXECUTION | STOP EXECUTION, CLOSE VEE |

The Retrieve Web Page method (Table 3.0, ID 1) has a URL property that is set by the executable data 315 and a pointer property set to any returned data. When the executable data 315 calls the Retrieve Web Page method, the VEE 415 requests and retrieves a web page pointed to by the URL. The data for the retrieved web page is stored and the VEE 415 sets the pointer property to the retrieved data.

The Get Date/Time method (Table 3.0, ID 2) is used to request the current date and time. The Save Data method (Table 3.0, ID 3) is used to save the program variables section 310 back to the CIF file when the CIF file stored locally or is writable by the computer displaying the CIF image. This allows variables modified by the executable data 315 to be saved back to the CIF file. The Output Image data method (Table 3.0, ID 4) is used to output the final version of the image data so it can be displayed or printed. The Terminate Execution method (Table 3.0, ID 5) is used to stop execution of the executable data 315 once the image data has been output.

The executable data 315 communicates with an application on the server computer 125 by encoding information in a URL that addresses an active server web page ("COUPON112.ASP") 477 stored on the web server 125. The application is stored in the active server web page 477 and is executed by the server side ASP component 465 when the page is requested. The encoded information includes the unique image ID, coupon name and unique computer ID. The application code, when executed by the server side ASP component 465, reads the information encoded in the URL and performs whatever function a designer of the CIF formatted coupon image 450 has required. It should be noted that the image designer has freedom to: design the features of the coupon, design what functions the executable data 315 stored in the image file will perform and design what functions will be performed by the application code stored in the active server web page 477. Implementing these functions requires writing programs, that work together, to perform these functions.

In the example depicted in the FIGS. 4A and 4B, the image/coupon designer decided to create programs that implemented a maximum limit on the number of copies that can be made from the coupon image 450. The designer created a unique image ID for the coupon and the database 480 to track how many times the coupon image 450 is rendered and the ID of each computer or electronic device that displays or prints the coupon image 450. By tracking this information, the designer can limit the number of times the coupon image 450 can be used.

The database 480 includes a first table 481 that has a first record type 482 for each coupon image being tracked. In this example, only one coupon 450 is being tracked. The first record 482 in the first table 481 tracks the total number of times the coupon image 450 is rendered. The Unique Image ID for the coupon image 450 is stored in the first data field 485. The coupons name is stored in the second data field 486. The value for the current number of time the coupon image 450 has been rendered is stored in the third data field 487 and maximum number of times the coupon image 450 can be rendered is stored in the four data field 488. The maximum number 488 has been set to 1000 times. Storing the maximum number of copies in the database 480 makes it easy to customize.

The database 480 further includes a second table 483 that includes a second record type 484 for each unique computer or device that renders the coupon image 450. Each second record type 484 includes the following fields: a first data field 489 that stores the Unique Image ID; a second data field 490 that stores the Unique Computer ID; and a third data field stores the number of times this computer or device has rendered the coupon image 450.

Continuing with the example, the web browser 405 is requested to display a web page with the coupon image 450 stored in the CIF format. The web browser 405 receives the coupon image file data 476 and executes the executable data 315. The executable data 315 reads information from the VEE 415 properties and encodes the information in a URL for the coupon112.asp file 477. The executable data 315 then uses the Retrieve Web Page method to request the coupon112.asp file. The web server 460 receives the URL for the coupon112.asp file 477 and reads the file 477 from the disk drive 470. The Server Side ASP component 465 identifies and executes the application code stored in the web page 477. The application code, when executed, reads the Unique Image ID, the Unique Computer ID and the coupon name from information encoded in the URL. The application code then uses the Unique Image ID and the Unique Computer ID to query the second table 483 in the database 480 to determine if a record 483 for this computer and image already exist. If it does, the application code increments value data field 491 by one. If no record is found, the application code creates a new record of the second data type 484 in the second table 483 and populates the fields setting the value data field 491 to 1. The application code then uses the Unique Image ID to query the first table 491 for the record that has the Unique Image ID and then increments the value data field 487 by 1. The program code then reads the max value data field 488 and determines if the incremented value is larger than the max value.

If the incremented value is larger than max value, the application code will perform one or more actions to prevent the coupon image 450 from being rendered. The action performed depends how the designer of the coupon image 450 wishes to handle the situation. The designer could send a message that states the coupon has expired or possible create a new coupon or send a message that tells the user to visit a web page for a new coupon. The designer is free to create any response supported by the present invention.

For this example, the coupon designer selects to display a message stating the coupon has expired. To accomplish this, the application code was designed to modify the data returned for the requested web page 477 to include a data token. The executable data 315 receives the data token and recognize it to mean do not display the coupon image 450 stored in the image data 320 but instead display a message which is also included in the data token. The executable data 315 then outputs image data that does not include the coupon image stored in the image data 320 but does include a message stating the coupon has expired. A person of ordinary skill in the art will understand that the coupon designer has the flexibility to design a number of different ways to handle what information is displayed in place of the coupon and how that information is generated when the maximum number of coupon copies has been reached.

Now for the case where the incremented value is less than the max value. The application performs one or more actions to cause the coupon image 450 to be properly rendered. In one embodiment, the program code modifies the data for the requested web page 477 to include a data token that the executable data 315 receives and recognizes as an authorization to display the coupon. The executable data 315 then outputs the image data 320 and the coupon image 450 is displayed.

In another embodiment, the image data 320 is encrypted and must be decrypted by the executable data 315 before it can be displayed. The application code includes in the requested web page 477 a data token to authorize the display of the coupon but also includes a decryption key to decrypt the image data 320. The executable data 315 then uses the decryption key to decrypt the image data 320 and cause the decrypted image data to be displayed.

In yet another embodiment, the application code includes in the requested web page 477 a data token to authorize displaying a coupon but also includes in the requested web page 477 new image data that is to be displayed in place of the image data 320. The executable data 315 then causes the received new image data to be displayed as the coupon image 450. This allows a remote computer to change the displayed image at anytime and for any reason.

In still another embodiment, the application code includes in the requested web page 477 a data token to authorize displaying the coupon and additional data that includes serial information used to serialize the coupon. The executable data 315 modifies the image data 320 based on the serial information to create a unique serialized coupon and sends the modified image data to the rendering engine 410 for display as the coupon image 450. The serialized information can be encoded in the image data and/or visible in the displayed image in a computer readable form.

The program variables section 310 of CIF image file includes any variables that are defined and used by the executable data 315. The VEE 415 loads the program variables 310 into memory and provides information through properties so that the executable data 315 can link to and directly access variables stored in this section. During execution of the executable data 315, the individual program variables can be read and modified. If the actual CIF image file is stored on or accessible by the computer or device that is displaying the CIF image, the VEE 415 has a method called "SAVE IMAGE" that will save a new version of the CIF image in place of the old version. The new version of the CIF image will include the current values for the program variables 310 and any modifications to the image data that existed when the "SAVE IMAGE" method is called. If the CIF image file is stored on another computer or device, the method does not save a new image and returns a failed status with information that the CIF file is not accessible.

The executable data 315 is responsible for outputting displayable image data to the rendering engine 410. The executable data 315 can be designed to generate the displayable image data in any number of different ways, some of which are discussed in the above examples. The definition for the CIF image format does not specify how the image data is generated or what format it most be stored in. The CIF definition only specifies the features and functions of the VEE 415 and the format of the CIF image file. A person designing a CIF image has the freedom to: use any type of the image data 320; design the executable data 315 to implement any functions, as long as they conform to the VEE 415 requirements and limitations; and design any application code that is executed by a web server in response to a request from the executable data 315. However, the person must assure that the design of all program code and image data work together to perform the desired function and to properly display an image.

Figure 5A:
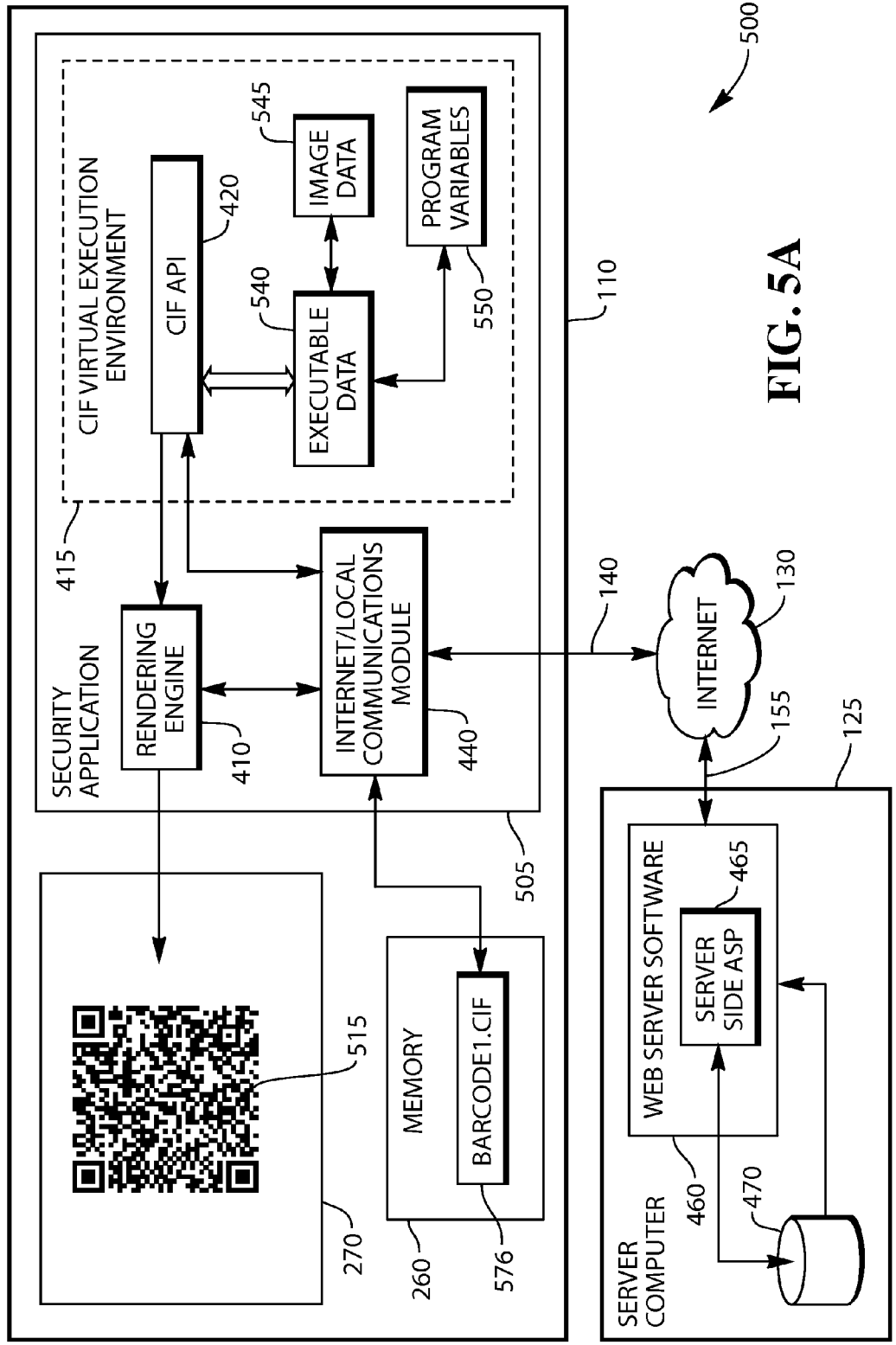
FIGS. 5A and 5B provide block diagrams illustrating a second exemplarily system for displaying a CIF formatted coupon image.
Figure 5B:
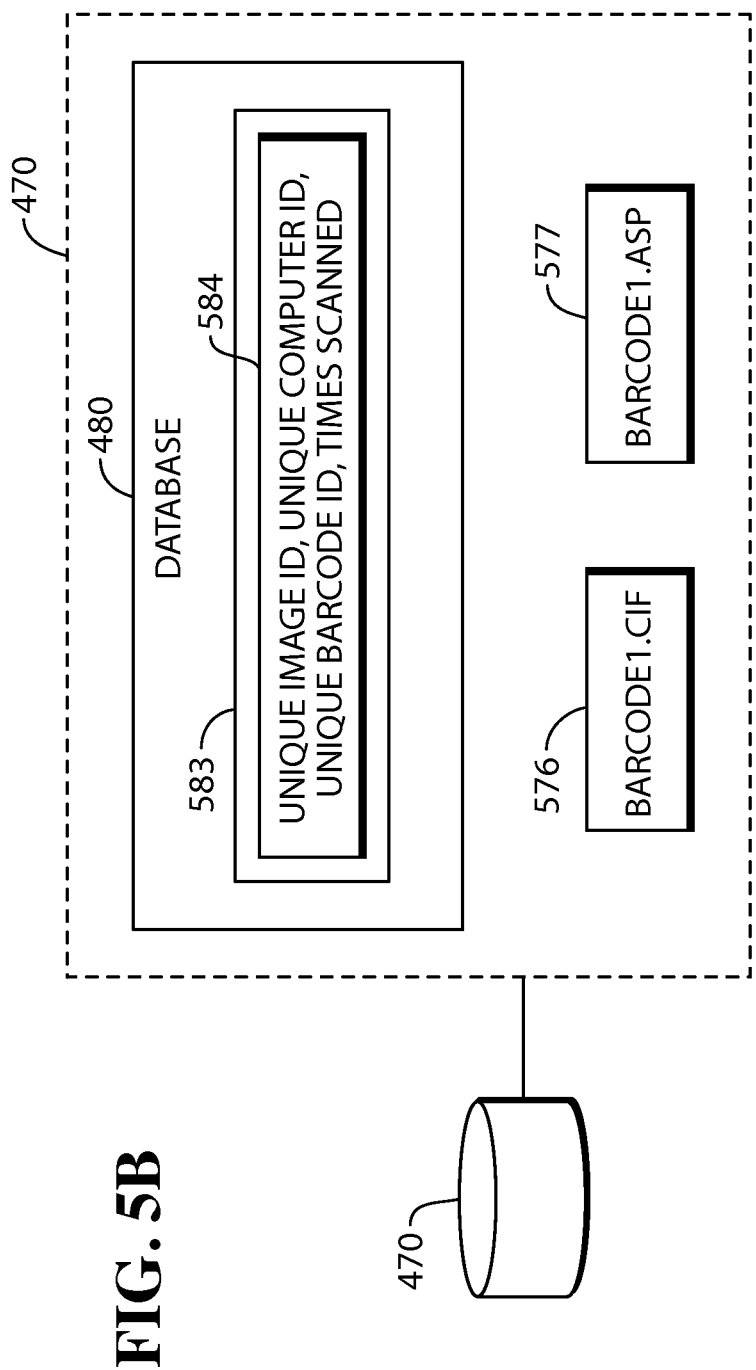

Turning to FIGS. 5A and 5B, there is provided a block diagram illustrating a second exemplarily system 500 for displaying a CIF formatted barcode image in a security application. The security application implements an electronic boarding pass function that is part of an airlines check-in and boarding process. In the traditional paper based check-in process, a paper boarding pass is issued to a passenger after an airline employee, kiosk or computer has confirmed the identity of the passenger and their reservation on a flight departing from the airport. A passenger must present a valid boarding pass to a gate agent before being allowed to board an airplane and airport security personnel require a passenger to have a valid boarding pass before being allowed into restricted areas of the airport such as gate areas. A paper boarding pass includes human readable text and a computer readable optical barcode.

Many airlines have started issuing electronic boarding passes. An electronic boarding pass includes a unique computer readable optical barcode stored as a digital image and sent a passenger's mobile device after the passenger has completed the check-in process. The electronic boarding pass works similar to the paper boarding pass. The passenger displays the received boarding pass digital image on their mobile device and presents the mobile device for scanning by a gate agent or by security personnel. Some airlines provide their own security application that displays the digital image of the boarding pass. However, security issues arise if a copy of a boarding pass barcode image is sent to somebody other than the confirmed passenger.

The system 500 includes the cell phone 110 and the server computer 125 where both are connected to the Internet 130 and able to communicate with each other. The cell phone 110 executes a security application 505 that displays an image 515 of a boarding pass barcode formatted using the CIF image format on a user display 270. The security application 505 is built on top the software components of the web browser 405 depicted in the FIG. 4A.

The server computer 125 is the same as shown and described in FIG. 4A, however different files are stored on the disk drive 470 and the database 480 has a different table 583 with a new data record 584. The new table 583 stores a record or row entry 584 for each boarding pass barcode image that is created. Table 4.0 below is a partial list of the data fields (ID) included in the data record 584. It should be noted that different embodiments will not necessarily use the same fields defined below.

TABLE 4.0

DATA FIELDS

| ID | NAME | DESCRIPTION |
| --- | --- | --- |
| 1 | UNIQUE IMAGE ID | UNIQUE ID ASSIGNED TO THE IMAGE FILE |
| 2 | UNIQUE DEVICE ID | UNIQUE ID FOR DISPLAYING DEVICE |
| 3 | UNIQUE BARCODE ID | UNIQUE ID ENCODED IN THE BARCODE |
| 4 | SCANNED COUNT | COUNT OF TIMES BARCODE WAS SCANNED |

TABLE 4.0-continued

DATA FIELDS

| ID | NAME | DESCRIPTION |
|---|---|---|
| 5 | RENDERED COUNT | COUNT OF TIMES BARCODE WAS RENDERED |
| 6 | AIRLINE | AIRLINE IDENTIFICATION CODE |
| 7 | FLIGHT NUMBER | FLIGHT NUMBER FOR BOARDING PASS |
| 8 | NOT VALID AFTER | DATE/TIME WHEN BARCODE EXPIRES |
| 9 | CUSTOMER ID | ID OF CUSTOMER FOR THIS BARCODE |

Data field 1, stores a unique image ID assigned to the barcode image when the image is created. Data field 2, stores a unique device ID that identifies the computer or electronic device assigned to display the barcode 515. Data field 3, stores a unique barcode ID that is a computer readable ID encoded into the barcode. Data field 4, stores the number of times the barcode image 515 has been scanned by airport personnel. Data field 5, stores the number of times the barcode image 515 has been rendered for display. Data field 6, stores a code used to identify the airline that issued the boarding pass. Data field 7, stores information on the flight number associated with this boarding pass. Data field 8, stores the expiration time and data for this boarding pass. Data field 9, stores information that is used to identify the customer authorized to use the boarding pass.

The displayed barcode image 515 is a two dimensional barcode. The data encoded in the barcode is divided in multiple fields including a unique image ID field and a rendered count field which is encoded with the number of times the barcode image 515 has been rendered for display. The executable data 540 is programmed to modify rendered count field with a new count every time the barcode image 515 is rendered for display. A count of the number of times the barcode image 515 is rendered is stored in the program variables 550 and because a copy of the "BARCODE1.CIF" file 576 is stored in the local memory 260, an updated version of the program variables 550 is stored in the local version of the "BARCODE1.CIF" file 576.

Each time the barcode image 515 is displayed, the rendered count field is incremented by one. Each time the barcode image 515 is scanned at a security station or at a boarding gate, the unique image ID field and the rendered count field is read and the data for each field is recovered. The unique image ID is used to identify and read the record 584 in the database 480 that has the same unique image ID. The rendered count from the read data record 584 is compared to the scanned rendered count. If the scanned rendered count is less than the rendered count from the data record 584, it is possible that the barcode image has been copied and is being used improperly and thus additional security checks are required. If the scanned rendered count is greater than or equal to the rendered count from the data record 584, the rendered count in the data record 584 updated to the value of the scanned rendered count and no additional security action is required.

In addition to using the database 480 to track the use of the barcode image 515, the unique device ID authorized to use the barcode image 515 is stored in the program variables 550. The executable code 540, prior to outputting the image data for the barcode, compares the stored authorized unique device ID with the actual unique device ID provided by the VEE 415. If the two IDs do not match, the executable code 540 will not output for display a valid boarding pass barcode. In some embodiments, a barcode that triggers a security check or error is output for display.

The above electronic boarding pass examples demonstrate secure methods that do not require real-time access to the server computer 125 to rendered the boarding pass barcode image 515 but they still provide an improved level of security. These methods are needed when mobile communications with the server computer 125 is either not available or temporary unavailable otherwise, secondary security protocols would be implemented which will slow down overall process.

When mobile communications with the server computer 125 are available, the executable code 540, when executed, encodes into a URL local information such as the unique device ID, unique image ID and unique barcode ID. The URL addresses the "BARCODE1.ASP" file 577 stored on the server computer 125. The executable code 540 then requests through the VEE 415 the ASP file 577. After the web server software 460 receives the request for the ASP file 577, the server side ASP component 465 executes the application code stored in the "BARCODE1.ASP" file 577. The application code reads the information encoded in the URL and uses it to identify and read the data record 584 that matches the unique image ID encoded in the URL. The application code compares the information encoded in the URL with the information stored in the matched data record 584. This includes updating the rendered count stored in the data record 584 and checking to see if the time period for using the barcode image is still valid (the time period check can also be performed by the executable code 540 when mobile communications with server computer 125 is not available). If all the information is correct, the application code returns a data token to the executable data 540 that authorizes the display of the boarding pass image data 515. Otherwise, the application data returns a data token that causes the executable data 540 to display a barcode image that triggers a security check or error.

Figure 6:
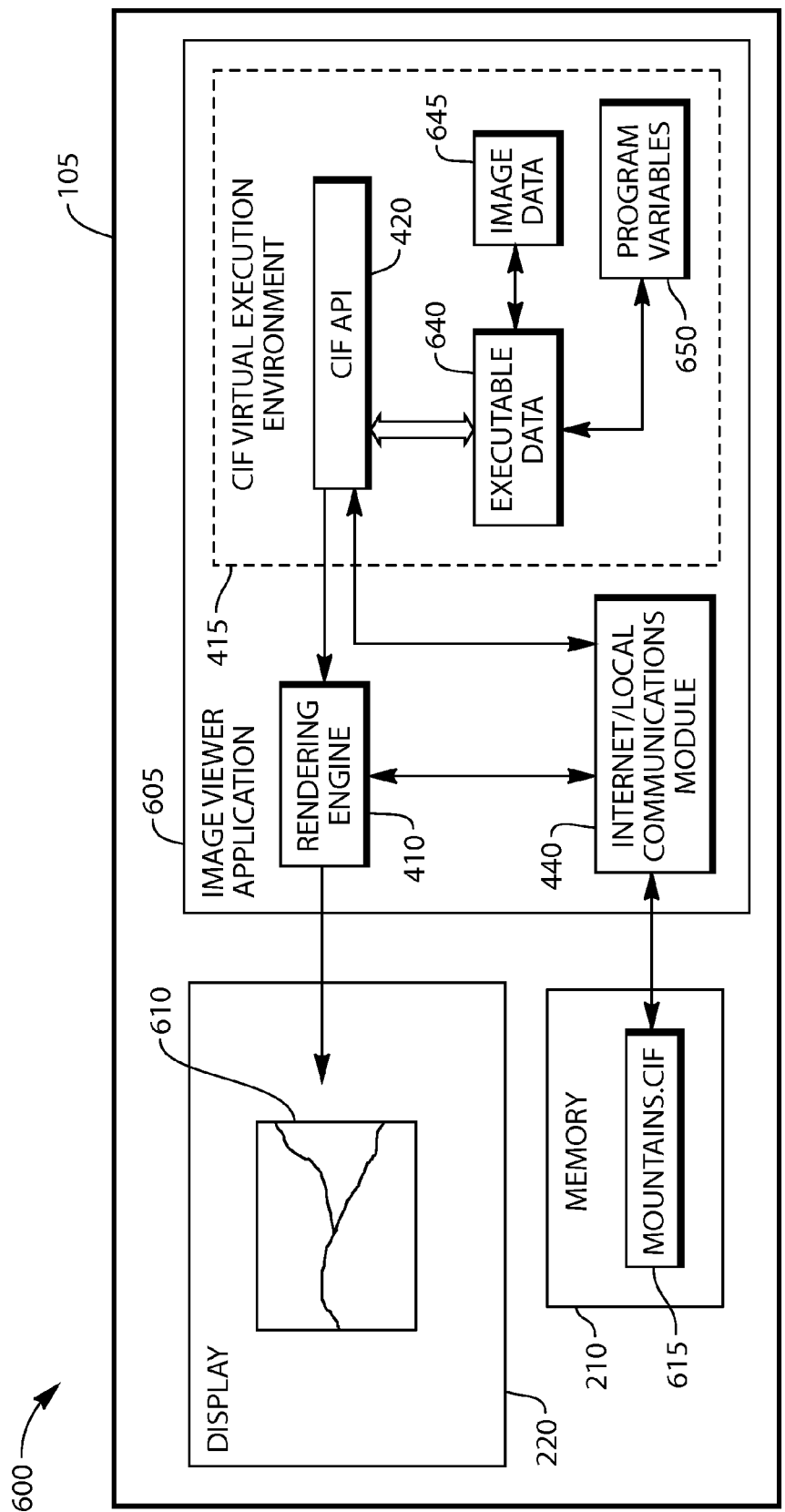
FIG. 6 is provided a block diagram illustrating an exemplarily system for displaying a copyrighted image in a CIF format.

With reference to FIG. 6, there is provided a block diagram illustrating an exemplarily system 600 for displaying a copyrighted image in a CIF format. The system 600 includes the first personal computer 105 that is running an image viewer application 605 that displays a copyrighted image 610 of mountains on the user display 220. The image 610 is stored in a CIF formatted file named "MOUNTAINS.CIF" 615.

In this example, the copyright restrictions for the image 610, restricts the viewing of the image 610 to the first personal computer 105 for a period of one year. When the image 610 is created, the unique device ID for the first personal computer 105 and the expiration date (current date plus one year) is stored in the program variables 650 of the CIF file 615 and the CIF file 615 is sent to the user.

The image viewer application 605 displays the image 610 by reading the "MOUNTAINS.CIF" file 615 from local memory 210 and storing the components of the CIF file 615 (i.e., executable data 640, image data 645 and program variables 650) in a VEE 415. The image viewer application 605 is built using components from the web browser 405. After the components of the CIF file 615 are loaded, the VEE 415 causes the executable data 640 to be executed. The executable data 640 compares the unique device ID from the VEE 415 with the authorized unique device ID stored in the program variables 650 and determines if they match. The executable data 640 also compares the current date from the VEE 415 with the expiration date stored in the program variables 650. If the unique device IDs match and the expiration date has not been reached, the image data 645 is output for display, otherwise an error message is displayed.

It should be noted that there are many different restrictions that can be placed on copyrighted material. This example demonstrates just two of types of restrictions that can be implemented using a CIF formatted image.

Figure 7:
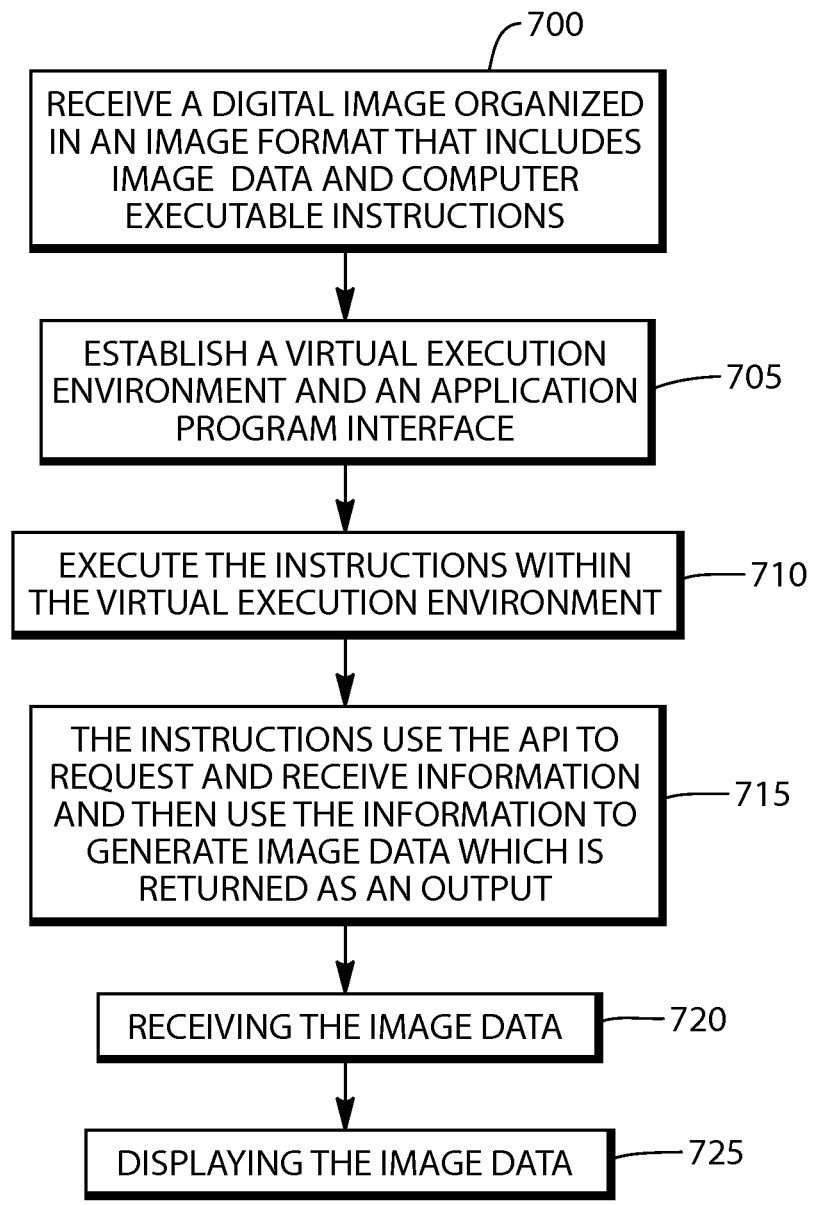
FIG. 7 illustrates a computer implemented process of displaying a digital image stored in the Computed Image Format (CIF) of the present invention.

FIG. 7 illustrates a computer implemented process of displaying a digital image stored in the Computed Image Format (CIF) of the present invention. At step 700, a software application receives a digital image for viewing. The digital image has been organized or stored in the CIF format 300 and includes image data 320 and executable data 315 or instructions 315. At step 705, the application establishes a virtual execution environment (VEE) 415. The VEE 415 provides an Application Program Interface (API) 420 to programs executing in the VEE 415. At step 710, the executable instructions 315 are executed within the VEE 415. At step 715, the executable instructions 315 use the API 420 to request and receive local information. In some embodiments, the executable instructions 315 use the API 420 to request and receive information from the remote computers server 125. The executable instructions 315 output image data for the digital image and then terminate execution. At step 720, the application receives the image data from the executable instructions 315. At step 725, the application displays the received image data which represents the received digital image.

Figure 8:
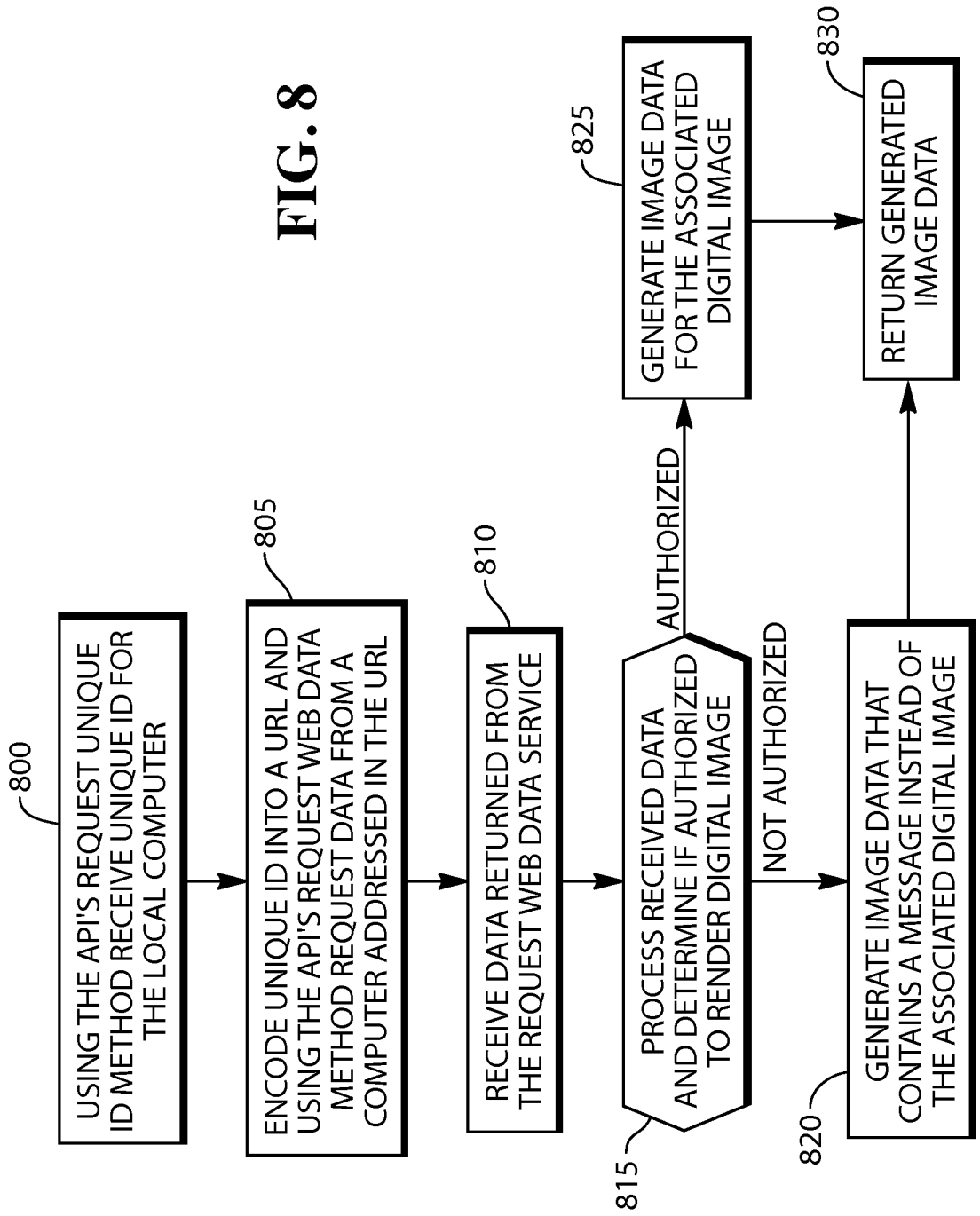
FIG. 8 illustrates a computer implemented process performed by the executable instructions executing in a virtual execution environment.

FIG. 8 illustrates a computer implemented process performed by the executable instructions 315 executing in the VEE 415. At step 800, the executable instructions 315 use the API 420 and requests local information including the unique device ID for the local computer or device that is executing the VEE 415 and the executable instructions 315. In some embodiments, the executable instructions 315 request the current time and date and the unique image ID. At step 805, the executable instructions 315 encode the unique device ID into a URL stored in the program variables 310. Using the Request Web Data method that is part of the API 420, the executable instructions 315 request a remote web page addressed by the URL. The API 420 issues a get web page request to the Internet or a local network using the URL. The URL addresses a web page stored on the server computer 125 and web server software 460 receives the get web page request and processes the requested the web page.

If the requested web page is an ASP file, a server side ASP component 465 executes application code that is included in the ASP file. The application code reads the encoded information in the URL and determines if the digital image should be authorized for viewing by the computer making the request. The application code modifies the data for the requested web page by adding a data token that includes authorization information. The web server software 460 returns the modified data for the requested file to the API 420. At step 810, the executable instructions 315 receive data through the API 420 for the requested remote web page. At step 815, the executable instructions 315 process the received data for the web page including the data token. If the data token includes authorization to render the image for display control transfers to step 825. If the data token denies authorization to render the image, control passes to step 820.

At step 820, the executable instructions 315 generate image data that contains an error message instead of the associated digital image. At step 825, the executable instructions 315 generate image data for the associated digital image. In some embodiments, the stored image data 320 is decompressed to generate the image data. In other embodiments, the stored image data 320 is encrypted and the executable instructions 315 decrypt the image data 320 using a key returned in the data token. In still other embodiments, the image data 320 includes fields that are updated with dynamic data. For example, the image data 320 could include a barcode and the executable instructions 315 modify the barcode to change information encoded in the barcode. In still other embodiments, the image data 320 is not used to generate the new image data. The data token can include new image data or the executable instructions can generate completely new image data. At step 830, the image data generated by the executable instructions 315 is returned or outputted through the API 420.

Although particular references has been made to embodiments that includes a personal computer, cell phone, tablet computer and server computer and examples have been provided illustrating the invention, certain other embodiments, variations and modifications are also envisioned within the spirit and scope of the following claims. Additionally, examples using different fixed and mobile computer devices connected to different types of networks are also anticipated.

I claim:

1. A computer implemented image rendering method for rendering a digital image using computer data organized in an image format where the image format includes image data and computer executable instructions, the method comprising the steps of:

receiving the digital image organized in the image format wherein the digital image includes original image data and computer executable instructions, and wherein the image format further includes program variable data that is accessed by the computer executable instructions during execution;

establishing a virtual execution environment to execute the computer executable instructions wherein the virtual execution environment provides an application program interface used by the computer executable instructions to receive information and request services and wherein the virtual execution environment provides the computer executable instructions access to the image data, and wherein establishing the virtual execution environment further includes providing the computer executable instructions access to the program variable data and wherein the information received by the computer executable instructions using the application program interface includes local environment information including the source of the digital image and information that uniquely identifies the computer executing the method;

executing the computer executable instructions within the virtual execution environment wherein the computer executable instructions, when executed, use the application program interface to receive information and request services from the virtual execution environment and wherein the computer executable instructions use the received information to generate new image data; and receiving the new image data as output from the computer executable instructions.

2. The method of claim 1, wherein the computer executable instructions are generated by a compiler program from instructions written in a computer programming language.

3. The method of claim 1, wherein the computer executable instructions are written in an interpreted computer programming language.

4. The method of claim 1, wherein the services provided by the application program interface includes a retrieve web data service that includes receiving a Uniform Resource Locator (URL) from the computer executable instructions that identifies a web page on a remote computer, performing a page request on a network using the URL, receiving data in response to the page request and returning the data to the computer executable instructions.

5. The method of claim 4, wherein the computer executable instructions, when executing within the virtual execution environment, communicates with a remote computer wherein the communications include sending information to the remote computer by encoding the information in the page request used by the retrieve web page service to request the web page and receiving information from the remote computer by receiving the response data from the page request.

6. The method of claim 5, wherein the information retrieved from the remote computer includes information used by the computer executable instructions to decode the image data stored in the digital image.

7. The method of claim 5, wherein the information retrieved from the remote computer includes supplemental image data used by the computer executable instructions to modify the image data stored in the digital image to generate the new image data.

8. The method of claim 5, wherein the information retrieved from the remote computer includes second image data and the computer executable instructions use the second image data instead of the image data that is already stored in the digital image to generate the new image data.

9. The method of claim 5, wherein the information retrieved from the remote computer includes information used by the computer executable instructions to generate the new image data.

10. The method of claim 5, wherein the information sent to the remote computer includes the information that uniquely identifies the computer executing the method.

\* \* \* \* \*